United States Patent [19]

Berry

[11] Patent Number: 5,280,938
[45] Date of Patent: Jan. 25, 1994

[54] WHEELCHAIR BRAKE

[76] Inventor: Theodore M. Berry, R.D. #7, Conventryville Rd., Conventryville, Pa. 19464

[21] Appl. No.: 860,858
[22] Filed: Mar. 31, 1992
[51] Int. Cl.⁵ .............................................. B60T 1/00
[52] U.S. Cl. .................................. 280/304.1; 188/2 F; 74/426; 74/489
[58] Field of Search ....................... 74/489, 502.2, 526, 74/529; 188/2 D, 2 F, 24.1, 24.16, 24.19; 280/250.1, 304.1

[56] References Cited

U.S. PATENT DOCUMENTS

| | | | |
|---|---|---|---|
| 3,679,257 | 7/1972 | Jacuzz et al. | 297/DIG. 4 X |
| 4,204,588 | 5/1980 | Kawecki | 188/2 F |
| 4,489,955 | 12/1984 | Hamilton | 280/250.1 |
| 4,916,967 | 4/1990 | Nakamura | 74/256 X |
| 4,977,792 | 12/1990 | Nagano | 74/489 |

FOREIGN PATENT DOCUMENTS 1141954  3/1957  France ................ 74/502.2

Primary Examiner—Margaret A. Focarino
Assistant Examiner—Victor E. Johnson
Attorney, Agent, or Firm—Caesar, Rivise, Bernstein, Cohen & Pokotilow

[57] ABSTRACT

A braking device for a wheelchair having at least one wheel and a frame having siderails adjacent the wheel is provided with a brake assembly surrounding the wheel for clamping and braking the motion of the wheel and with a connecting and mounting assembly connected to the brake assembly which mounts the brake assembly onto the siderail forward of the wheel and positions the brake assembly forward of the wheel parallel to and aligned with the axis of rotation of the wheel. Also provided is a brake actuating member connected to the mounting assembly which actuates the brake member. Still further, a locking member is provided adjacent the brake actuating member for locking the actuating member in position when the brake member is clamped to the wheel. The invention also discloses a structure for braking and clamping two wheels of a wheelchair with one brake actuating member.

18 Claims, 3 Drawing Sheets

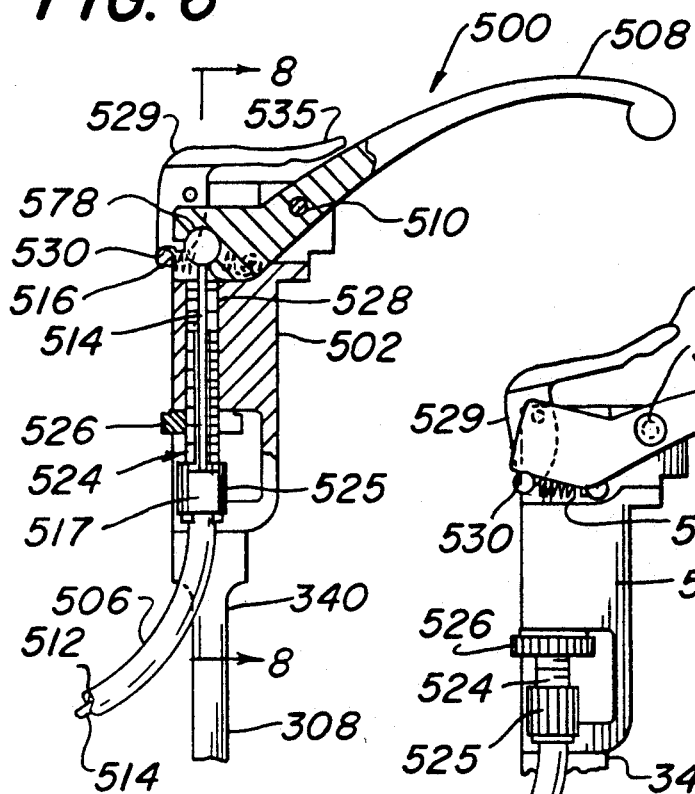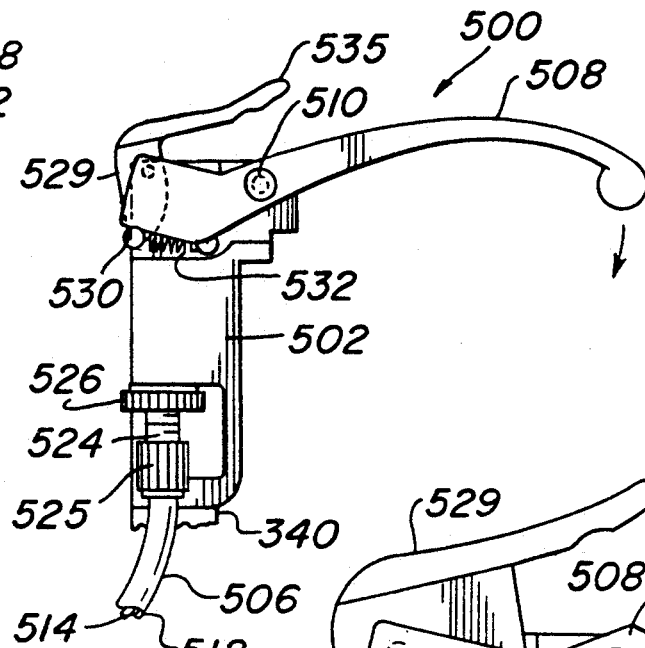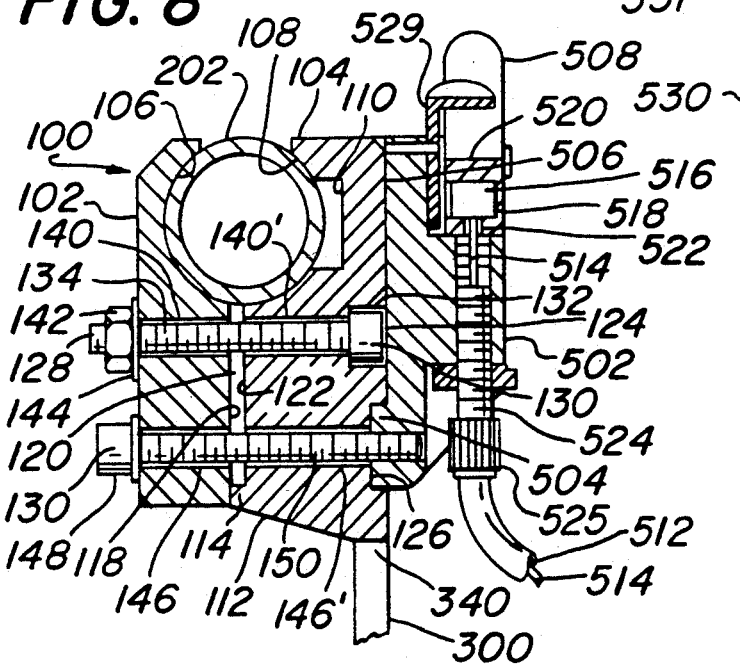

WHEELCHAIR BRAKE

FIELD OF THE INVENTION

This invention relates generally to the field of wheelchairs and more particularly to brakes or brake locking devices for wheelchairs.

BACKGROUND OF THE INVENTION

Numerous devices for braking and preventing wheelchairs of various types of construction from moving are known, and many of these devices are the subject of United States patents. The patents to Herron, U.S. Pat. No. 4,560,181, and Lamarie, U.S. Pat. No. 4,538,826, relate to or disclose wheelchair braking devices wherein caliper-type brake attachments are provided which urge against the wheelchair wheel rim in order to control the movement of the wheel. In the Herron patent, the brake mechanism includes a handbrake mounted on a lever arm which is coupled through a brake cable to a brake assembly. There appears to be no specific description of how the brake assembly is mounted to the frame. The patent to Lemarie includes a type of propelling mechanism whereby a caliper-type arrangement, including engagement pads, contacts the rim of the wheelchair wheel in order to aid in propelling the wheel.

Additional patents to DeWoody et al. and Fought et al., U.S. Pat. Nos. 4,560,003 and 4,887,830, respectively, disclose more conventional types of braking apparatus for wheelchairs. In each of these patents, the braking mechanisms includes a braking member which urges directly against the tire, rather than the rim, to prevent movement.

Wheelchair brakes are also disclosed in the patents to Marshall, U.S. Pat. No. 3,529,700; Hammack, U.S. Pat. No. 2,426,451; Wierwille, U.S. Pat. No. 4,384,732; Minnebraker et al., U.S. Pat. No. 4,570,756; Kulik, U.S. Pat. No. 4,852,697; and Knoche, U.S. Pat. No. 4,350,227. All of these patents disclose braking devices for wheelchairs wherein braking pressure is applied directly to the tire rather than to the wheel rim.

Of particular interest is the patent to Kawecki, U.S. Pat. No. 4,204,588, wherein a wheelchair braking apparatus which incorporates a caliper brake as the braking member is disclosed. That Kawecki invention includes a braking device which locks the primary wheels so that when an individual gets out of the wheelchair the braking mechanism can be actuated to prevent the chair from rolling backward. The specific wheelchair disclosed in the Kawecki patent includes a pair of crossbraces to which are attached a bracket consisting of an upright portion and a horizontal portion. The vertical or upright portion spans the distance between the crossbraces and is provided with holes at each end so that U-bolts can pass therethrough to attach the bracket to the brace members. The horizontal portion is preferably welded to the upright portion and extends outwardly therefrom beyond the primary wheels and parallel to the axis which mounts the primary wheels onto the wheelchair. A vertical pivot point is provided on the horizontal portion of the bracket directly in line with and proximate to the primary wheel. A conventional two-arm caliper brake having a pair of brake pads is affixed to the pivot point. The brake pads are connected to a control wire. When the wire is pulled, the brake pads come into contact with the rim of the wheel. The wire is controlled by what is termed a remotely located actuating device which includes a pivotal lever arm connected at one end to the wire. Forcing the pivot arm downwardly causes the wire to pull and ultimately urges the brake pads against the wheel rim.

During recent years with the advent of lighter and stronger tubular materials, wheelchairs have undergone important technological improvements. No longer is it necessary for wheelchairs to literally resemble "chairs on wheels" with rigid vertical frames and vertical wheels with armrests and handles for pushing. Wheelchairs today are lighter, more maneuverable and reflect the increased desire of many wheelchair-bound persons to be able to get about as independently as possible.

While the wheelchair frame and materials have undergone an important evolution, little has been done to improve the ability of the wheelchair user to stop the motion of the wheelchair and maintain a fixed position.

One of the most used devices for stopping and securing the wheelchair is a brake device similar to that shown in the Minnebraker et al. patent, U.S. Pat. No. 4,570,756, where a lever arm is provided which urges a braking member into contact with the tread of the wheelchair tire. While a popular device, this brake causes unnecessary wear to the tire tread, is not totally effective in holding the wheelchair on sloped surfaces and becomes almost unusable when the tire is wet. The device is only applied to one wheel, so if stopping action is desired on both wheels of the wheelchair, two devices must be applied and engaged by using two hands, which sometimes simply is not possible.

Furthermore, many of the former types of braking devices were developed for use with wheelchairs with armrests and are designed by be attached to the armrests. Many of the newer, lightweight model wheelchairs do not even have arms.

In this regard, it would be beneficial if a wheelchair brake were available which will overcome these and other deficiencies in the prior art types of wheelchair braking devices.

OBJECTS OF THE INVENTION

Accordingly, it is the general object of this invention to provide an apparatus which increases the ability of the user of a wheelchair to easily and safely control the motion of the wheelchair.

It is an object of the invention to provide a wheelchair brake which controls the movement of the wheelchair wheels by clamping the rim of the wheels between a caliper-type clamp, rather than applying pressure to the tire tread.

It is an additional object of the invention to provide a wheelchair brake which can be easily and effectively attached to any shape of wheelchair frame in front of the wheel to be braked without having to be attached to an armrest of the wheelchair.

It is another object of the invention to provide a wheelchair brake which stops the motion of the main wheels of the wheelchair at the same time with the application of pressure to a single brake actuating mechanism.

It is a further object of the invention to provide a wheelchair brake which is actuated by applying a downward and forward force to the brake actuating mechanism.

It is yet another object of the invention to provide a wheelchair brake wherein the braking mechanism can be locked into position to prevent movement of the wheelchair wheels even after pressure is removed from the brake actuating mechanism.

It is an object of the invention to provide a wheelchair brake wherein the brake mechanism can be adjustably angled to conform to the camber of the wheelchair wheels.

It is also an object of the present invention to provide a compact brake actuating mechanism which can be easily adjusted to vary the amount of pressure necessary to effect the braking of the wheelchair wheels.

SUMMARY OF THE INVENTION

These and other objects of the instant invention are achieved by providing an improved apparatus for braking and holding fast the wheels of a wheelchair. The improved braking device is mounted onto the siderail of the wheelchair forward of at least one primary wheel of the chair. The brake assembly includes a caliper brake positioned to clamp the rim of the wheel and which is axially aligned with the axis of rotation of the wheel. A pivotable brake lever is connected to a mounting assembly clamped onto the siderail and a connecting structure connects the mounting assembly to the caliper brake. The connecting structure extends vertically downward from the mounting assembly and horizontally at the bottom end thereof parallel to the axis of rotation of the wheel which may be angled to accommodate a camber in the wheel. The caliper brake is mounted on the connecting structure. A cable connects the brake lever and the caliper brake in such a manner that rotating the lever causes the brake to clamp against the wheel rim and prevent rotation thereof. A locking apparatus is positioned adjacent the lever arm to automatically retain the lever arm in the brake actuating position until the locking apparatus is released. The invention also includes an embodiment wherein caliper brakes are mounted adjacent each wheel of the chair. Each brake may be independently operated or a second cable may interconnect the two caliper brakes such that actuation of the first caliper brake also causes the second brake to actuate at the same time. The brake lever is positioned such that a forward and downward motion cause the lever to pivot and initiate the brake clamping.

BRIEF DESCRIPTION OF THE DRAWINGS

Other objects and many of the attendant advantages of this invention will be readily appreciated as the same becomes better understood by reference to the following detailed description when considered in connection with the accompanying drawings wherein:

FIG. 6 is a fragmented side elevational view partially cutaway of the brake actuating and locking mechanism of the present invention;

FIG. 7 is a side elevational view of the brake actuating and locking mechanism of the present invention;

FIG. 8 is a cross-sectional view taken along the line 8—8 in FIG. 6; and

FIG. 9 is a fragmented side elevational view of a second embodiment of the brake actuating and locking mechanism of the present invention.

DESCRIPTION OF THE PREFERRED EMBODIMENT OF THE INVENTION

Figure 1:
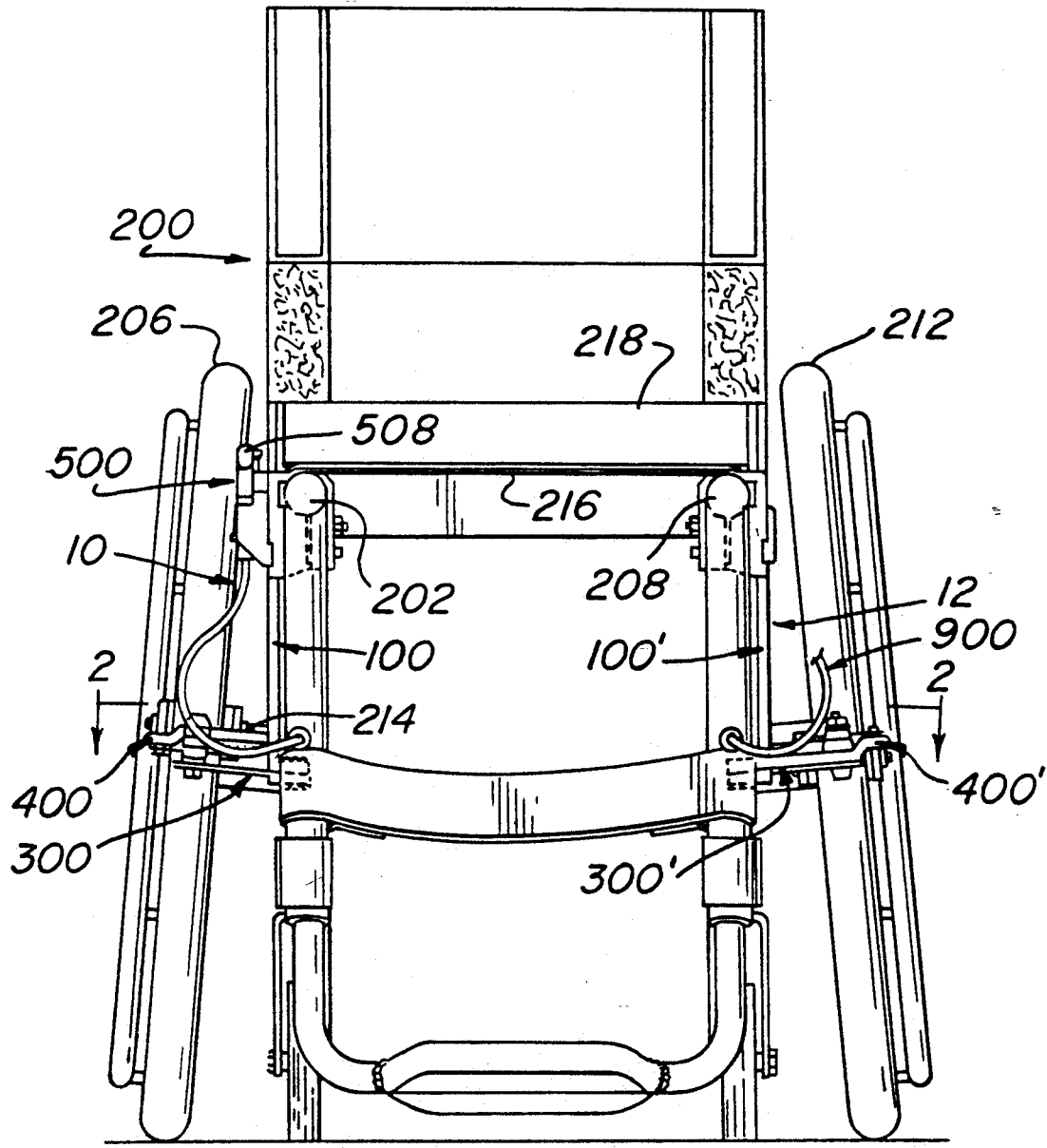
FIG. 1 is a front elevational view of a wheelchair with the braking device of the present invention mounted thereon.

Referring in greater detail to the various figures of the drawings wherein like reference characters refer to like parts, a wheelchair braking apparatus of the present invention is generally shown at 10 in FIG. 1 connected to a wheelchair 200.

The braking apparatus 10 includes a mounting assembly 100 connected to one of the siderails 202 of the frame of the wheelchair 200. A connecting assembly 300 at the bottom of the mounting assembly 100 interconnects a brake assembly 400 surrounding the rim 204 of one of the main wheels 206 of the wheelchair to the mounting assembly 100. An actuating assembly 500 is connected to the mounting assembly 100. The actuating assembly 500 is further connected to the braking assembly 400 and operates to actuate the braking assembly and cause it to clamp against and grip the rim 204 of the main wheel 206 of the wheelchair 200. Clamping of the brake assembly 400 against the rim 204 prevents the wheel 206 from rotating.

As further shown in FIG. 1, a second braking apparatus 12 is mounted onto a second siderail 208 opposite the first siderail 202. The second braking apparatus 12 includes a second mounting assembly 100' connecting the apparatus 12 to the siderail 208 in the same manner as the first mounting assembly 100. Furthermore, a second connecting assembly 300' connects the mounting assembly 100' to a second brake assembly 400' in the same manner the first connecting assembly 300 connects the first mounting assembly 100 and the first braking assembly 400. In the embodiment shown in FIG. 1, rather than have a second actuating assembly similar to the first actuating assembly 500, which would be acceptable under some circumstances, the second brake assembly 400' is connected to the first brake assembly 400 by a cable 900 which causes the second brake assembly 400' to clamp the rim 210 of the second main wheel 212 of the wheelchair 200 at the same time the actuating assembly 500 causes the first brake assembly 400 to clamp the rim 204 of the first main wheel 206.

It can still further be seen in FIG. 1 that the invention is adapted to be used with a wheelchair 200 of the type that does not have armrests or arm supports and which has primary wheels 206, 212 axially mounted onto the frame of the wheelchair at an angle or camber, thereby causing the wheels to angle outward from vertical. Such wheelchair construction is known in the art and provides a lighter and more maneuverable wheelchair than older conventional model wheelchairs, especially those with vertical primary wheels and armrests. The invention, of course, can be easily used with vertical primary wheels as well.

The present invention envisions the use of either one or both of the braking apparatuses 10, 12, which have substantially identical construction, except for certain allowable modifications which will be discussed. Because of the similarity, discussion will primarily be made with respect to only the first braking apparatus 10.

Figure 2:
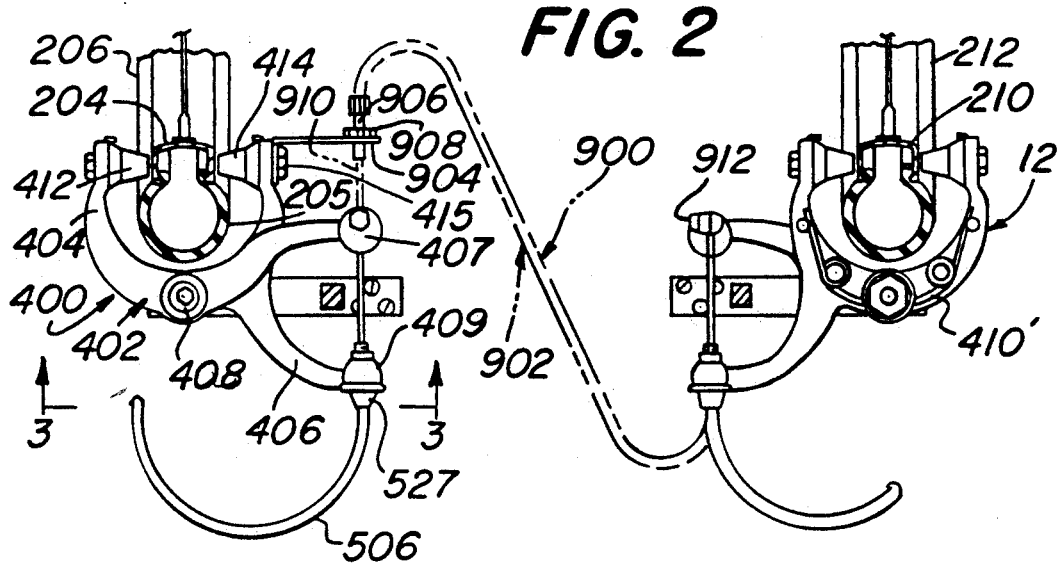
FIG. 2 is an enlarged cross-sectional view taken along the line 2—2 in FIG. 1 showing the interconnection between the braking mechanisms of the present invention.
Figure 3:
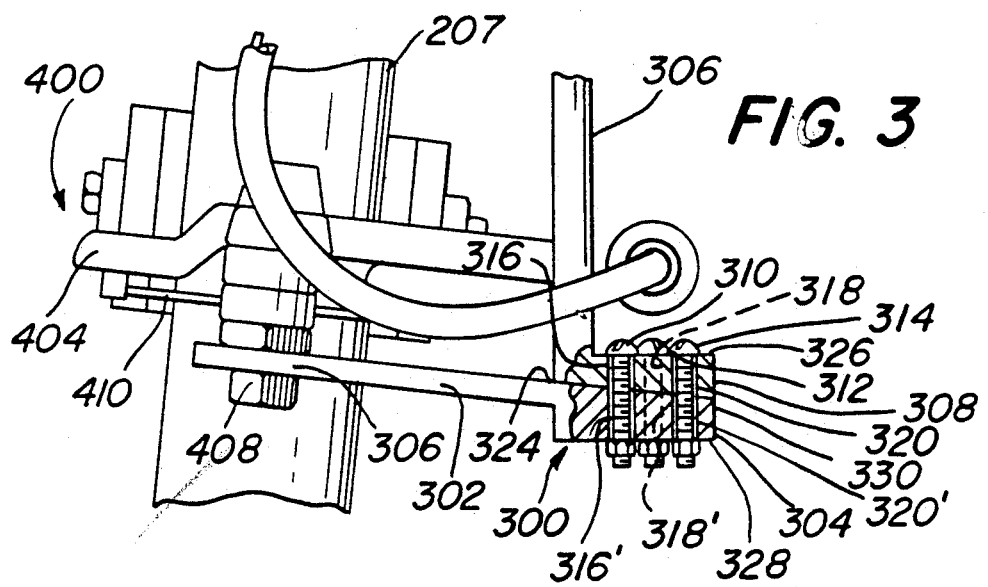
FIG. 3 is an enlarged fragmented front elevational view partially cut away showing one embodiment of the connecting assembly for the brake member of the present invention taken in the direction of line 3—3 in FIG. 2.

As shown in FIGS. 1-3, the brake assembly 400 of the first apparatus 10 is a conventional-type caliper brake 402 with a pair of caliper arms 404, 406 pivotally mounted on a bolt 408 which acts as an axis of rotation for the two arms. The ends 403, 405 of the two caliper arms 404, 406, respectively, are biased apart from each other about the bolt 408 in a conventional manner by means of a biasing wire (not shown, but shown as the biasing wire 410' in the second brake apparatus 12 depicted in FIG. 2).

The two caliper arm ends 403, 405 have fitted thereon on brake pads 412, 414. The use of such pads is known in the art, and it is preferred that the pads be able to be replaceable when worn. The caliper arms 404, 406 surround the main wheel 206 and are positioned so that the pads 412, 414 urge against the rim 204 of the wheel in order to clamp and prevent rotation of the wheel when the caliper arms are caused to overcome the biasing force of the biasing wire urging them apart and pivot toward the rim.

As shown most clearly in FIG. 3, the caliper brake 402 is positioned so that the pivot bolt 408 is parallel with the tire 205 mounted on the main wheel 206 and the caliper arms are substantially parallel to and horizontally aligned with the axle 214 of the wheel. The pivot bolt 408 is mounted onto the connecting assembly 300 and passes though a connecting plate 302 of the connecting assembly 300. The base end 304 of the connecting plate 302 is attached to the base end 308 of a connecting rod 306 by three screw bolt and nut combinations 310, 312, 314 passing through aligned bores 316, 316', 318, 318', 320, 320', respectively. The connecting rod 306 extends downwardly vertically from the mounting assembly 100.

In order to position the pivot bolt 408 so that it is parallel to the tire 207, the connecting plate 302 extends outwardly away from its base 304 at an angle equivalent to and parallel to the axle 214 or axis of rotation of the wheel 206. The connecting plate 302 is of sufficient length that the pivot bolt 408 through the plate can be aligned with the centerline of the tire 207. The top surface 324 of the connecting plate 302 is an extension of the top surface of its base end 304; and accordingly, the top surface 324 of the base is angled. In order for the top surface 326 of the base end 308 of the connecting rod 306 to be parallel to the bottom surface 328 of the base end 304, the bottom surface 330 of the base end 308 must be formed at an angle complimentary to the angle of the top surface 324. This orientation of the two bases 304, 308 is necessary so that the bores 316, 316', 318, 318', 320, 320' can be vertically and coaxially aligned with each other.

Figure 4:
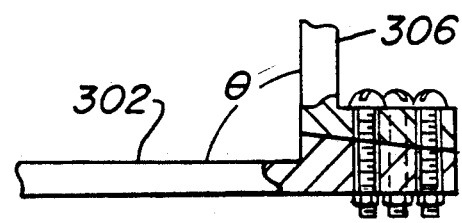
FIG. 4 is a fragmented front elevational view partially cut away of a second embodiment of the connecting assembly for the brake member of the present invention.
Figure 5:
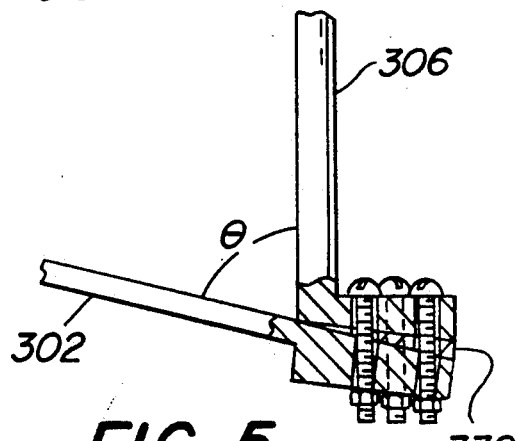
FIG. 5 is a fragmented front elevational view partially cut away of a third embodiment of the connecting assembly for the brake member of the present invention.

In the two alternative embodiments of the connecting assembly 300 shown in FIGS. 4 and 5, the angle $\Theta$ by which the connecting plate 302 extends from the connecting rod 306 is changed from the angle shown in FIG. 3. By varying the angle $\Theta$, the orientation of the pivot bolt 408 can be varied to correspond to a change in the camber angle of the wheel 206. For example, in FIG. 4, the angle $\Theta$ of the connecting plate 302 is changed to 90° by turning the connecting plate 302 over so that the bottom surface 328 of the base end 304 abuts the bottom surface 330 of the base end 308. By so changing the angle of the connecting plate 302, the pivot bolt 408 can vertically position the brake, such as when there is no camber to the wheel 206 and the wheel is vertical. In the embodiment shown in FIG. 5, a wedge 332 is placed between the bottom surface of the base 308 of the connecting rod 306 and the top surface 324 of the base 304 of the connecting plate 302 when an even greater angle $\Theta$ is desired. The wedge 332 of appropriate thickness is inserted between the two bases to increase the angle established between the two bases 04, 308. Thus by using a wedge between the bases, the connecting assembly can be adjusted to accommodate different camber angles of the wheel, at least to the point where the bores 316, 316', 318, 318', 320, 320' remains substantially aligned in order to receive the requisite bolts therethrough.

The upper end 340 of the connecting rod 306 is connected to the mounting assembly 100 and is preferably integrally formed therewith, even though it is understood that other means of connecting the connecting rod to the mounting assembly are possible. The connecting rod 306 is of sufficient length to allow the brake assembly 400 on the connecting plate 302 to be positioned directly in front of the wheel 206 and be aligned with the central axis of rotation or hub of the wheel.

As shown in FIG. 8, the mounting assembly 100 includes first and second clamping members 102, 104 which are designed to fit around and clamp the tubular siderail 202 of the wheelchair 200 therebetween. The first clamping member 102 is provided with an arcuate interior surface 106 at the upper inside edge thereof which is designed to at least partially surround the siderail 202. Likewise, the upper inside edge of the second clamping member 104 is also formed with an arcuate interior surface 108 which is substantially opposite the surface 106 of the first clamping member when the first and second clamping members are positioned on opposite sides of the siderail 202. The inside edge of the second surface 108 is also provided with a notch 110 along the longitudinal length thereof. The notch 110 provides a space which accommodates the sling-like support 216 for the seat cushion 218 that forms the seat of the wheelchair. The support 216 wraps around the siderail 202 and has a rectangular rod-like member at the edge thereof through which bolts or screws are inserted to attach the support to the siderail. This is a known construction for the support 214, and the notch 110 accommodates this rectangular rod so that the clamping member 104 on either side of the notch can fit more snugly against the siderail 202. The notch 110 also makes it possible for the second clamping member 104 to fit around any bolts or other projections on the siderail, even if the rod-like member for the support for the seat cushion does not get in the way.

Near the bottom edge 112 of the second clamping member 104, a projection 114 extends away from the clamping member 104 toward the confronting face 118 of the first clamping member 102, thereby creating a spacing 120 between the two confronting faces 118, 122 of the first and second clamping members when the two clamping members are positioned around the siderail 202 of the wheelchair.

The outer face 124 of the second clamping member 104, is formed with a second groove or notch 126 which receives the brake lever plate 502 of the brake actuating assembly 500. In particular, as shown in FIG. 8, the brake lever plate 502 has a projection 504 along the side thereof which fits into the second notch 126 on the second clamping member 102. The sidewall 506 of the lever plate 502 abuts the wall 124 of the second clamping member when the projection 504 is inserted into the notch 126.

The first and second clamping members 102, 104 are urged toward each other so that they form a clamping action around the siderail 202 by means of a bolt 128 and a screw bolt 130 which pass through the two clamping members. As shown in FIG. 8, the bolt 128 has a head 130 which fits into a recess 132 on the side of the second clamping member 104 and threaded body portion 134 which extends through aligned bores 140, 140' in the first and second clamping members. A nut 142 is threaded onto the end of the threaded body portion 134 and a washer 144 is positioned around the threaded portion of the bolt 128 between the nut 142 and the outer wall of the first clamping member 102. Since the aligned bores 140 140' have a diameter less than the diameter of the recess 132 in the second clamping member and smaller than the head 130 of the bolt 128 positioned in the recess 132, tightening the nut 142 pulls the two clamping members close together and creates a clamping of the siderail 202 between the arcuate surfaces 106, 108 of the two clamping members.

The connection between the two clamping members, and affixing of the brake lever plate 502 against the second clamping member, is further secured by the screw bolt 130 extending through second aligned bores 146, 146' in the two clamping members. The screw bolt 130 has a head 148 adjacent the outer surface of the first clamping member 102 and a threaded body 150 which extends through the aligned bores 146, 146' and into a threaded bore 420 in the brake lever plate 502. Rotation and tightening of the screw bolt 130 not only threads the bolt into the lever plate 502 and thereby secures the bolt to the lever plate, it also urges the first and second clamping members closer together, until no further movement of the clamping members is possible due to the positioning therebetween of the siderail 202 and the projection 114 on the second clamping member. The projection 114 allows the arcuate surface 106 to squeeze lightly around siderail 202 as the nut 142 is tightened on the bolt 128 and more securely hold against the siderail than would be possible if the two arcuate surfaces 106, 108 were drawn evenly together. If the arcuate surfaces were to simply surround the sidearm, it might be possible for the mounting assembly to rotate. This is less likely to happen if the arcuate surface is caused to pivot inward slightly because of the projection 114.

The caliper brake 402 is connected by a cable 506 to an operating brake lever 508 of the actuation assembly 500. The lever 508 is pivotally mounted on the brake lever plate 502 by means of a pivot pin 510 passing through the brake lever 500 and secured in the lever plate. The cable, as shown in FIGS. 6-8 includes an outer sheath 512 and an inner coaxial wire cable 514 slidably fitted within the sheath. Fixed to the end of the wire cable 514 and fitted within the brake lever 508 is a cylindrical fitting 516. This fitting 516 slides into and is held within a cutout 518 in the lever 508. (See FIG. 8.) The cutout 518 includes a first cutout portion 520 which opens into the lever from the inside edge of the lever adjacent the lever plate 502, parallel to the axis of rotation of the lever. The cutout 518 further includes a second, smaller, cutout portion 522 transverse to the first cutout portion 520 which is wide enough for the cable wire 514 to fit therethrough.

At the end of the outer sheath 512 shown in FIG. 6 is a metal cap 517 press fitted thereto and loosely mounted within a knurled end piece 525 at the base of a threaded extension through which the cable 514 extends toward the fitting 516. At the opposite end of the sheath 512 is a second threaded extension 525 threaded through the end 409 of caliper arm 406. The cable 514 extends through the extension 527 to the end 407 of the caliper arm 404 where it is secured in any known manner. The end of the sheath 512 at the second threaded extension 527 is loosely fitted within the extension 527. The threaded extension 524 has a threaded snug nut washer 526, which is knurled around its outer circumference, threaded thereon. The threaded extension is designed to be threaded into a vertical threaded opening 528 in the lever plate 502.

By rotating the end piece 525, the threaded extension rotates within the vertical opening 528 and moves upward or downward therein depending on the direction of rotation of the end piece.

By rotating the first threaded extension 524 downward at the knurled end piece 525, the metal cap 517 within the end piece 524 urges against the sheath 512 and forces the sheath 512 surrounding the cable 514 against the second threaded extension 527, thereby causing the caliper ends 406, 407 to move closer together and thus causing the brake pads 412, 414 to move closer toward the rim 204 of the wheel.

The significance of this ability to move the brake pads toward the rim is the ease with which the brakes can be adjusted to accommodate wear of the brake pads. No tools are necessary; all that is required is rotation of the extension 524 downward as the brake pads wear. When the threaded extension 524 is positioned, the sung nut 526 is rotated upwardly against the lever plate 502 to hold the extension in position once the desired position is achieved.

At the top of the lever plate is a locking lever 529 pivotally mounted thereon. As best shown in FIGS. 6 and 7, the locking lever has a projection 530 at the base thereof which extends directly behind the lever 508. Connected to the projection 530 is a biasing spring 532 which is connected at its opposite end by means of a screw to the lever plate 502. The biasing tension of the spring 532 continuously urges the projection 530 against the edge of the lever 508, and when the brake lever 508 is urged downward during braking (as will be discussed more fully hereinafter) the biasing spring pulls the projection 530 under the brake lever (FIG. 7) and thereby prevents the brake lever from returning to its previous position until the locking lever 529 is urged forward at the knob 535 against the force of the biasing spring, and the projection 530 is rotated out from under the brake lever 508.

The knob 535 has a slight "thumb" depression on its upper surface to facilitate pushing and to distinguish it from the smooth upper surface of the brake lever.

A second embodiment of the locking lever 529 is shown in FIG. 9. The lever 529 functions essentially the same as lever 529 shown in FIGS. 6 and 7, except for the biasing force of the spring 532'. Unlike spring 532 which is a tension spring that pulls the projection 530 toward and underneath the lever 508, the spring 532' is a compression spring seated in a hole 534 in the lever plate 502 underneath the locking lever 529. Because the spring 532' is a compression spring (rather than a tension spring like 532), the spring 532' urges the locking lever 529 to rotate about its axis of rotation 531 so that the projection 530' is continuously urged against the locking lever 529.

In this second embodiment shown in FIG. 9, the forward and downward braking movement against the brake lever 508 causes the brake lever to pivot and allows the locking lever 529 under the urging of the spring 532' to rotate about its axis 531 so that the projection 530 moves underneath the end of the braking lever. As with the first embodiment, the braking lever remains locked in the braking position until the locking lever is released by pushing forward on the locking lever at the thumb depression formed therein.

By positioning the caliper arms 404, 406 around the rim 204 of the wheel 206 and clamping the mounting assembly 100 around the siderail 202 as described above, the braking apparatus 10 is affixed to the wheelchair around one of the wheels so that it can control the rolling movement of that wheel and thus brake and/or lock in position that wheel upon the application of a forward and downward motion against the brake lever 508. As presented earlier, although the invention is capable of braking the motion of the wheelchair with just the mounting of the one braking apparatus 10 onto one of the siderails, in an alternative embodiment of the invention, the second braking apparatus 12 can also be attached to the opposite siderail 208 in order to apply clamping force against the second wheel rim, thereby more evenly and securely controlling the rolling motion of the wheelchair.

Rather than provide a second brake lever on the second braking apparatus 12 (which is possible), in the alternative embodiment shown in FIG. 2, a second co-axial cable 902 (as shown by the phantom lines in FIG. 2) is provided. A bracket 904 is mounted onto the caliper arm 406 by means of the same screw assembly 415 which affixes the brake pad 414 to the caliper arm 406. The end of the cable 902 has fittings 906, 908 similar to the threaded extension 524 and snug nut washer 526 which connect the cable 902 to the bracket 904. These fittings allow for connection to the bracket and adjustment of tension as discussed with respect to the cable 514 and the lever arm 508. The inner cable wire 910 extends through the threaded extension 906 and is clamped to the caliper arm 404 at the same location as the inner wire 514. This clamping of the inner wires, as seen at the clamp site 912 on the second brake assembly 12, in done in any conventional manner known in the art, such as by an adjustable clamp which holds the wire between opposing surfaces.

To effect braking with the apparatus of the invention once it is positioned on the siderail 202, the brake lever 508 is urged forward and down, thereby pulling against the end of the inner cable 514 at the fitting 516 and causing the caliper brake arms 404, 406 to urge toward each other at the ends 407, 409. Furthermore, the brake arms 404, 406 pivot about the pivot bolt 408 and urge the brake pads 412, 414 toward the wheel rim 204 until the wheel rim is securely clamped therebetween and rotation of the wheel is prevented. If the second braking apparatus 12 is provided, the pulling together of the ends 407, 409 will also pull the inner wire 910 of the second cable 902 and cause a similar pivoting and clamping motion against the second wheel.

The downward pivoting motion of the lever arm 508 also allows the locking lever 529 under the biasing action of the spring 532 to rotate so that the projection 530 moves underneath the end of the pivot arm 508 as shown in FIG. 7, thus prohibiting the release of tension on the cable until the locking lever 529 is rotated from beneath the lever arm. This occurs by pushing forward against the knob 535 of the locking lever and overcoming the biasing tension of the spring 532. Once the locking lever is rotated forward, the lever arm 508 can pivot rearward as the caliper arms 404, 406 are urged apart under the influence of the biasing spring (as shown in FIG. 2 with regard to apparatus 12) affixed thereto. This automatic rotation of the locking lever projection 530 under the brake lever 508 is especially important when the wheelchair is moving up or down an inclined surface, since it locks the wheels and prevents movement of the wheelchair whenever pressure is released from the brake lever 508. This is an especially important safety feature. This forward and downward motion against the lever arm 508 is an important distinction over prior caliper brakes. By positioning the lever arm 508 essentially in line with the tire 206 (FIG. 1), braking can be accomplished at the end of the sweep of the forward arm motion which rotates the wheel or by simply leaning forward in the chair with a hand on the lever arm. Simplicity and ease of actuation are especially important to the operation of such a device, since many wheelchair-bound persons have severely limited ranges of motion, other than just the inability to walk. Prior devices requiring rearward and downward gripping motion against the lever arm are not as easily operated.

Without further elaboration, the foregoing will so fully illustrate my invention that others may, by applying current or future knowledge, adopt the same for use under various conditions of service.

I claim:

1. A brake apparatus for use on a wheelchair having at least one primary wheel with a wheel rim and an axis of rotation and a frame siderail adjacent said wheel, said apparatus comprising:
    a) a mounting assembly mounted to said siderail forward of said wheel;
    b) a caliper brake surrounding and engageable with said wheel rim;
    c) connecting means vertically spacing and mounted said mounting assembly to said caliper brake;
    d) brake actuating means connected to said mounting assembly forward to said wheel and to said caliper brake for actuating said brake and causing said brake to engage said wheel rim, thereby prohibiting said wheel from rotating about said axis of rotation, said brake actuating means being comprised of:
        cable means having two opposite ends connected to said caliper brake at a first end thereof, and
        lever means positioned on to said mounting assembly and connected to the end of said cable means opposite said caliper brake for pulling said cable means vertically at said lever means and actuating said caliper brake connected thereto; and
    e) said brake actuating means being positioned on said mounting assembly vertically no higher than the highest point of said wheel and being actuatable upon the application of a downwardly forward force thereto.

2. An apparatus as claimed in claim 1, further comprising brake-locking means engageable with said actuating means for locking said actuating means when the caliper brake engages said wheel.

3. An apparatus as claimed in claim 1, wherein said mounting assembly is comprised of first and second clamp members, each clamp member being adapted to fit at least partially around said siderail forward of said wheel.

4. An apparatus as claimed in claim 1, wherein said connecting means is comprised of:
   a) a connecting rod having top and bottom ends connected at said top end thereof to said mounting assembly and extending downward therefrom; and
   b) a connecting plate at the bottom end of said connecting rod, said connecting plate extending from said connecting rod forward of said wheel at an angle substantially equivalent to and parallel to the axis of rotation of said wheel.

5. An apparatus as claimed in claim 4, wherein said connecting rod and said connecting plate have substantially, vertically and co-axially aligned bores therethrough and further comprising means through said bores for attaching said rod and plate to each other.

6. An apparatus as claimed in claim 4, further comprising means between said connecting rod and said connecting plate for establishing the angle at which said plate extends from said rod.

7. An apparatus as claimed in claim 6, wherein said means is a wedge member positioned between said connecting rod and said connecting plate.

8. An apparatus as claimed in claim 4, wherein said caliper brake is mounted on said connecting plate and said caliper brake is substantially parallel to and substantially horizontally aligned with the axis of rotation of said wheel and extends rearward from said connecting plate to engage said wheel rim.

9. An apparatus as claimed in claim 4, wherein:
   a) said connecting rod has a first base end at the bottom end thereof and said connecting plate has a second base end adjacent first base end;
   b) said first base end having an angled bottom surface and said second base end having an angled top surface complimentary, to said angle of said first base end bottom surface; and
   c) said first base end and said second base end each having at least one vertical bore therethrough, said bores being substantially vertical and substantially co-axially aligned with each other.

10. An apparatus as claimed in claim 1 wherein said lever means is comprised of:
   a) a lever plate mounted on said mounting assembly;
   b) a pivot on said lever plate; and
   c) a lever arm having first and second ends pivotally mounted at said pivot on said lever plate, said lever arm being connected at said first end of said second end of said cable means and the second end of said lever arm being moveable about said pivot downwardly forward with respect to the forward direction of motion of said wheelchair.

11. An apparatus as claimed in claim 10, wherein said second end of said lever arm is lower than the highest point on the circumference of said wheel.

12. An apparatus as claimed in claim 10, wherein said cable means is comprised of:
   a) a cable wire connected to said caliper brake and said lever means;
   b) an outer sheath surrounding and spaced from said cable wire, said outer sheath having a first end and a second end;
   c) sheath connecting means surrounding said first end of said sheath and connecting said first end of said sheath to said lever plate; and
   d) said sheath connecting means being moveable with respect to said lever plate to urge said sheath toward said caliper brake.

13. An apparatus as claimed in claim 12, wherein:
   a) said lever plate has a threaded opening therein; and
   b) said sheath connecting means has an outer surface and is threaded on the outer surface thereof and fits within said threaded opening in said lever plate, whereby rotating said sheath connecting means outward with respect to said threaded opening urges said cable sheath toward said caliper brake.

14. An apparatus as claimed in claim 13, wherein said sheath connecting means is comprised of:
   a) a threaded extension member; and
   b) a cap member over said first end of said sheath and fitted within said threaded extension member.

15. An apparatus as claimed in claim 10, further comprising brake-locking means engagable with said actuating means for locking said actuating means when the caliper brake engages said wheel.

16. An apparatus as claimed in claim 15, wherein said brake locking means is comprised of:
   a) a pivot located on said lever plate adjacent said lever arm;
   b) a locking lever pivotally mounted on said pivot on said lever plate said locking lever having first and second ends on opposite sides of said pivot location;
   c) a projection at said first end of said locking lever adjacent said first end of said lever arm;
   d) biasing means connected to said locking lever for urging said locking lever to rotate about said pivot on said lever plate toward said second end of said lever arm, whereby said projection is constantly urged toward said lever arm and is moveable to a position beneath said first end of said lever arm when force is applied to said second end of said lever arm to actuate said caliper brake and the first end of said lever arm is rotated away from said projection; and
   e) said locking lever being moveable about said pivot from a position where said projection moves from beneath said first end of said lever arm with the application of sa downwardly forward force to the second end thereof.

17. An apparatus as claimed in claim 16, wherein said biasing means is a compression spring forcing against said second end of said locking lever and causing said lever arm to rotate to urge said projection toward said lever arm.

18. An apparatus as claimed in claim 16, wherein said biasing means is a tension spring connected to said second end of said locking lever pulling said second end of said locking lever and causing said lever arm to rotate and urge said projection toward said lever arm.

* * * * *

UNITED STATES PATENT AND TRADEMARK OFFICE
CERTIFICATE OF CORRECTION

PATENT NO. : 5,280,938
DATED : January 25, 1994
INVENTOR(S) : Theodore M. Berry

It is certified that error appears in the above-indentified patent and that said Letters Patent is hereby corrected as shown below:

Column 10, line 42, delete "mounted" and insert --mounting said caliper brake to--;

Column 10, line 43, after "assembly" delete "to said caliper brake";

Column 10, line 45, change "to" (first occurrence) to --of--;

Column 10, line 53, after "positioned on" delete "to".

Signed and Sealed this

Thirteenth Day of December, 1994

Attest:

BRUCE LEHMAN

Attesting Officer         Commissioner of Patents and Trademarks